INVENTOR.
EDWARD V. CORDES, JR.

Jan. 5, 1971  E. V. CORDES, JR  3,553,682
NUMERICAL INDICATING SYSTEM
Filed June 9, 1967  3 Sheets-Sheet 2

INVENTOR.
EDWARD V. CORDES, JR.
BY
Yount, Raney, Flynn & Jarolli
ATTORNEYS

Header omitted 3,553,682
NUMERICAL INDICATING SYSTEM
Edward V. Cordes, Jr., Bentleyville, Ohio, assignor to
The Warner & Swasey Company, Cleveland, Ohio, a
corporation of Ohio
Filed June 9, 1967, Ser. No. 644,976
Int. Cl. G08c 9/00; H03k 13/24
U.S. Cl. 340—347          10 Claims

ABSTRACT OF THE DISCLOSURE

A system for displaying a digit value in response to a digit value signal or signals applied to input terminals connected to digit indicating control devices by digit value signal transmitting means. The digit value signal transmitting means is controlled by erase-write circuit means which in response to an erase-write signal renders the digit indicating control devices incapable of indicating a digit to erase any setting therein and thereafter renders the signal transmitting means effective to apply a digit signal to the proper control device to indicate the proper digit value. The input terminals for the display have two digit values appearing thereon, one odd and one even, and the digit transmitting means is controlled by an odd or even signal to distribute the digit value signal on a terminal to the proper one of the digit control devices. The erase-write circuit renders the digit transmitting means effective for a momentary period following the termination of the erase-write signal to set the proper control device and thereafter renders the digit signal transmitting means ineffective to transmit a signal applied thereto. A plurality of displays are connected periodically, in turn, to a corresponding encoder for setting the display by code converting circuitry which is connected in turn between each of the encoders and the corresponding display.

The present invention relates to a system for indicating a digit value and more particularly to systems for indicating a position of a member which may be moved along one or more coordinate axes.

The present invention contemplates a new and improved system for indicating digit values in which the digit values are indicated on a multi-cathode display tube having conduction through the cathodes controlled by a breakdown device which has two stable states.

The present invention also contemplates a new and improved digit display system in which current control devices in the cathodes of a multi-cathode display tube are controlled by digit value signals applied to input terminals of signal transmitting means which is rendered effective to transmit a digit signal in response to an erase-write circuit which operates in response to an erase-write pulse to reset the conductive devices to erase any digit being displayed by the tube and which then renders the signal transmitting means effective during a momentary period after the erase-write signal to set the current control device corresponding to the digit value applied to the input terminals.

The present invention also provides a new and improved readout system for indicating the position of a movable member along a plurality of coordinate axes in which display systems for displaying the position number of the member along respective coordinate axes are periodically connected to the output of code converting circuitry at the same time that the input of the circuitry is connected to an encoder for encoding the position along the axis to set the display in accordance with the position indicated by the encoder with the display comprising a plurality of multi-cathode tubes which have current control devices in the cathodes thereof that are actuated to a stable conductive state by a digit value and which are actuated to a non-conductive state in response to an erase signal applied to the display prior to being set again in accordance with the reading of the encoder.

In accordance with the present invention, a readout display is provided which is particularly adapted for use in a display which is used in a multiplexed system and which is periodically connected to an output indicating a value to be displayed.

Further advantages of the present invention will be apparent from the following description of the preferred embodiment thereof made with reference to the accompanying drawings from a part of the present specification for all subject matter disclosed therein and in which:

FIG. 1 is a block diagram of a system embodying the present invention;

FIG. 2 indicates the output circuitry of the binary decimal-to-decimal decoding system;

While the present invention is useful in various types of systems in which it is desirable to display the position of a member which is movable along one or more coordinate axes and is useful regardless of the particular numerical system involved, it is herein illustrated in a system where the member is moving along two coordinate axes, although the system may include additional axes.

Figure 1:
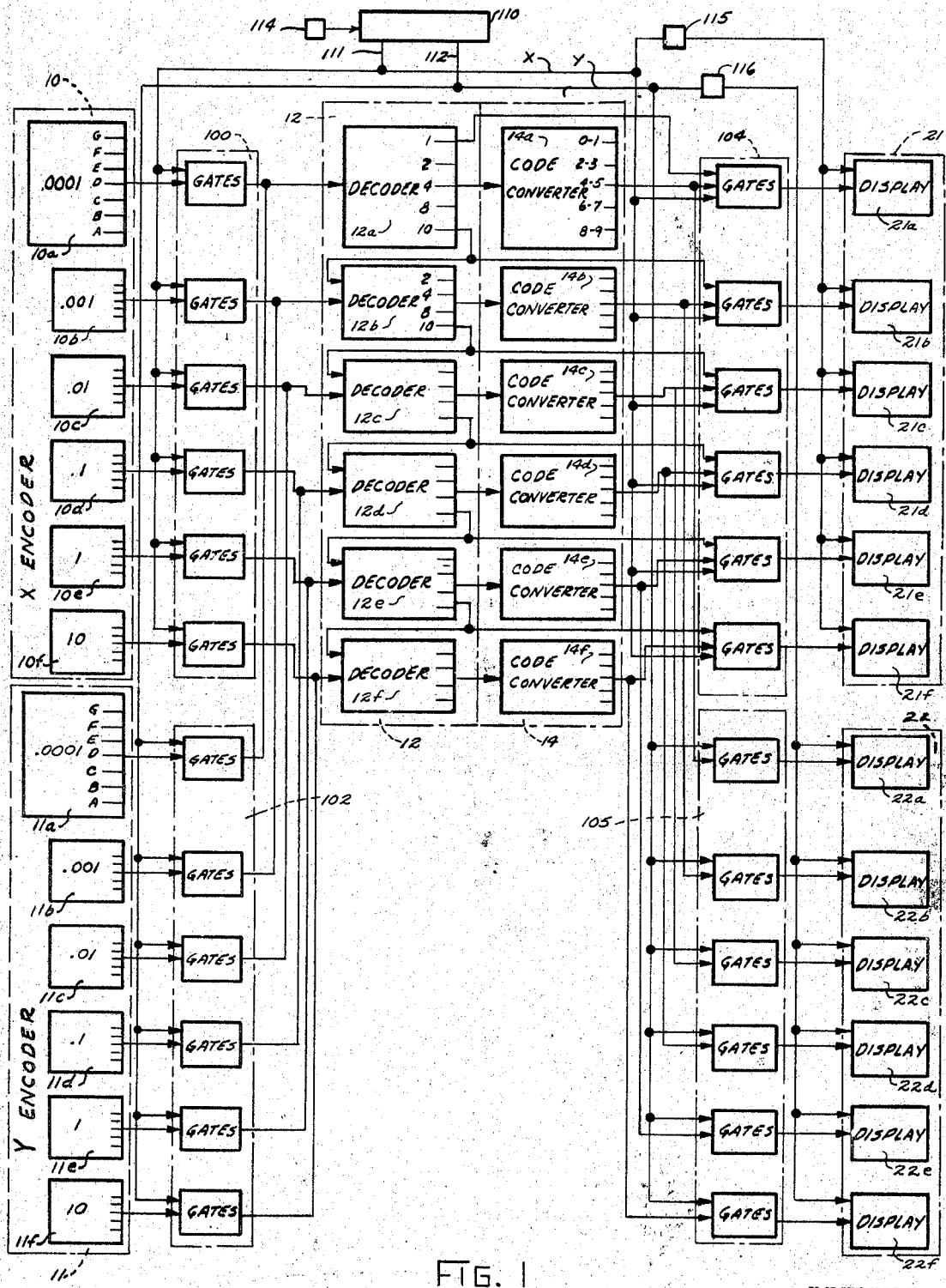

Referring to the drawings, an encoder 10 for the X axis is indicated in FIG. 1 by block diagrams 10a, 10b, 10c, 10d, 10e, 10f representing encoding sections for prividing a six digit position number having four decimal places. Similarly, a Y encoder 11 has six encoding sections designated 11a, 11b, 11d, 11e and 11f for providing a six digit number indicating the position along the Y coordinate axis.

Figure 4:
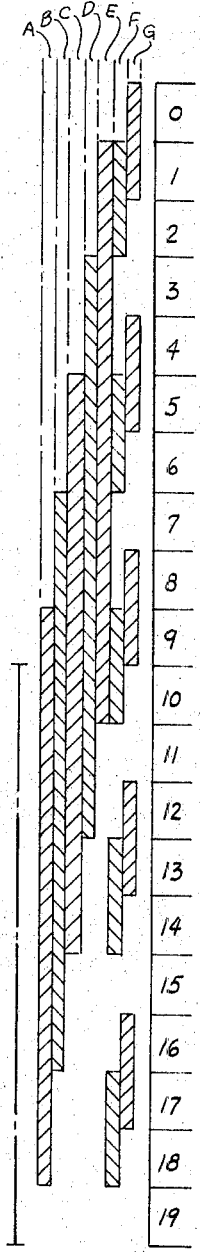
FIG. 4 illustrates the code used in the preferred embodiment.

The encoding sections of the encoders are illustrated as providing binary outputs which are in the form of phase displaced square waves providing on and off signals in a binary notation which may be decoded by decoding circuitry 12 having logic sections 12a, 12b, 12c, 12d, 12e, 12f corresponding to respective sections of the encoders to provide a binary-coded decimal representation of the digit. The phase displaced binary square waves are outputs from zone tracks A through G for the fine encoder sections 10a, 11a. These tracks are shown in FIG. 4 which is part of a complete zone on a code wheel. The tracks shown in FIG. 4 are repeated to form the complete zone, as will be understood by those skilled in the art. This particular encoder is the subject matter of United States application Ser. No. 560,951, filed June 6, 1966, by Ralph H. Schuman and is described in detail therein. However, other suitable codes may be utilized.

The decimal value derived from the fine zones is represented in binary form and is given by the following logic equations.

$$2^0 = FG + \overline{FG}$$

$$2^1 = \overline{GA}E + GA\overline{E}$$

$$2^2 = \overline{G}(\overline{A}C + B\overline{D}) + G(\overline{B}D + A\overline{C})$$

$$2^3 \overline{GBE} + GBE$$

$$10 \times 2^0 = \overline{G}(A + \overline{E}) + A\overline{E}$$

As will be understood from the above, the code is a cyclic code which repeats itself every 20 units and the existence of a digit value 10 in the zone indicates the presence of the digit value 1 in the next coarser zone, The code wheels for the coarser zone, that is, the encoder sections 10b, 10c, 10d, 10e and 10f, are essentially the same as the encoder sections 10a except the one digit is not obtained by use of A, G and F zone but from the preceding encoding section depending on whether or not there is an output at the 10 terminal of the decoder as indicated in FIG. 1. If an output is present at the 10 terminal, this indicates a one in the next coarser section while if the output at the 10 terminal is 0 it indicates the lack of a 1 in the next coarser section.

Figure 2:
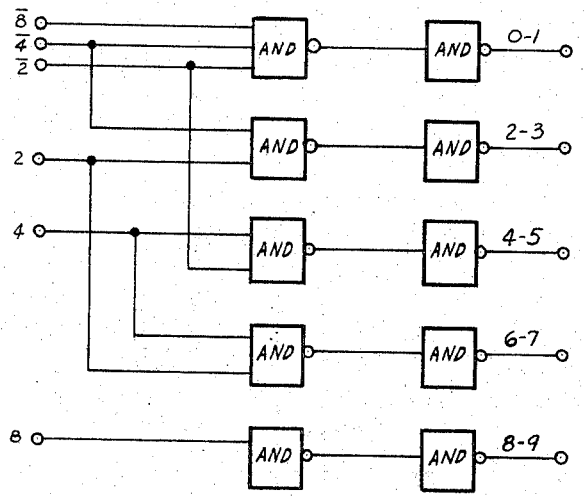
Figure 3:
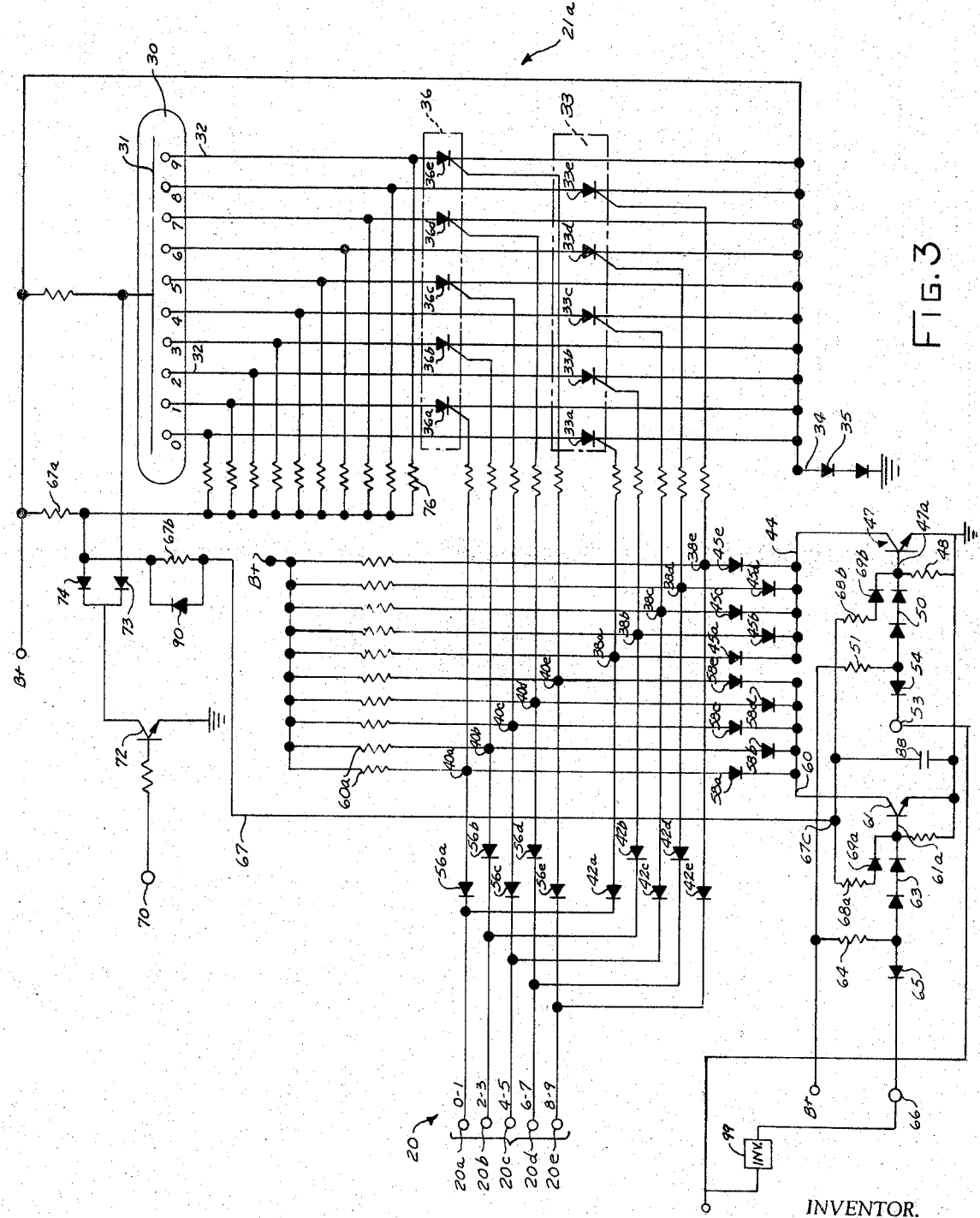
FIG. 3 is a circuit diagram of the display for one of the digits of the system of FIG. 1.

The binary-coded decimal output from the decoding circuit 12 is applied to a code converter 14 for converting the code from binary decimal-to-decimal. The code converter has six sections 14a, 14b, 14c, 14d, 14e, 14f, each of which has five output terminals. The five output terminals each signal a particular odd and a particular even digit value and, as indicated in FIG. 1, one output terminal represents the digit 0 or 1, another output terminal represents the digit 2 or 3, a third output terminal indicates the digit 4 or 5, etc. FIG. 2 illustrates a circuit for converting the outputs from the decoder to provide the five decimal outputs. The outputs from the binary decimal-to-decimal converting circuitry are applied through gating circuits 104, 105 to the input 20 having terminals 20a, 20b, 20c, 20d and 20e, of either an X readout display 21 or a Y readout display 22 each having a section corresponding to each encoder section. The readout sections are designated 21a, 21b, 21c, 21d, 21e and 21f while the Y readout sections are designated 22a, 22b, 22c, 22d, 22e, 22f. FIG. 3 illustrates the readout display section 21a in detail, the others being the same as section 21a.

Referring to FIG. 3, the readout display section 21a includes a multi-cathode tube 30 having a common anode 31 and cathodes 32 which represent respective ones of the digits 0, 1, 2 . . . 9. When conduction is established between the common anode 31 and a respective one of the cathodes, the tube displays the digit represented by the cathode. Such tubes are well known and are commercially available. The cathodes of the display tube 30 which represent the even digits, i.e., 0, 2, 4, 6, 8, are connected by even digit indicating control means 33 to a terminal 34 which is, in turn, connected to ground by a pair of series-connected diodes 35. The even digit indicating control means includes a silicon controlled rectifier in each of the cathode circuits and the rectifiers which correspond to the digits 0, 2, 4, 6 and 8, have been given the designation 33a, 33b, 33c, 33d and 33e, respectively. The cathodes of the display tube representing the odd digits, i.e., 1, 3, 5, 7 and 9 are connected to the junction 34 through digit indicating control means 36. The digit indicating control means 36 includes a silicon controlled rectifier in each of the cathode circuit and the silicon controlled rectifiers for the digits 1, 3, 5, 7 and 9 have been given the reference numerals 36a, 36b, 36c, 36d and 36e, respectively.

The gate element of the silicon controlled rectifiers for the even digit indicating means are connected to output terminals of respective input AND gates. The output terminals for the gates for the even silicon controlled rectifiers are designated by the reference numerals 38a, 38b, 38d and 38e and correspond respectively to the even silicon controlled rectifiers 33a, 33b, 33c, 33d and 33e. The output terminals for the AND gates corresponding to the odd silicon controlled rectifiers have been designated by the reference numerals 40a, 40b, 40c, 40d and 40e and correspond respectively to the silicon controlled rectifiers 36a, 36b, 36c, 36d and 36e.

The output terminals 38a . . . 38e of the even AND gates are connected respectively to the input terminals 20a, 20b, 20c, 20d and 20e of the display means for section 21a through respective diodes 42a, 42b, 42c, 42d and 42e. The output terminals 38a . . . 38e for the even gates are also connected to a common input conductor 44 through diodes 45a, 45b, 45c, 45d and 45e, respectively. The output terminals 38a . . . 38e are also connected to B+ through respective resistors 46. The gates formed by the diodes will be recognized by those skilled in the art. For example, diodes 42a, 45a constitute an AND gate with the terminal 38a functioning as the output so that an output will appear at the terminal 38a only when an input appears on terminal 20a and the common input conductor 44. These inputs will block the conduction of the diodes 42a, 45a causing the potential of the output terminal 38a to rise to supply an input signal to the even SCR 33a. Consequently, when a digit value appears on the terminal 20a, it will not cause the firing of the SCR 33a unless there is an input to the other diode, that is, unless the conductor 44 has an input thereon.

The conductor 44 is normally connected to ground through the collector-emitter path of a transistor 47 having a base 47a. When the transistor 47 is non-conductive, conduction through the diodes 45a . . . 45e is blocked to supply a common input to one input of each of the even AND gates for controlling the transmission of signals to fire the even SCR's 33a . . . 33e. The base 47a of the transistor 47 is connected to ground by a resistor 48 and is connected to the B+ terminal of the power supply through a pair of series-connected diodes 50 and a resistor 51. A junction between the resistor 51 and the series-connected diodes 50 is connected to a control terminal 53 by a diode 54 poled to conduct in a direction away from the junction. A bi-level signal is applied to the terminal 53 to either block the diode 54 or to allow conduction through diode 54. When conduction is blocked, base current flows through the diodes 50 and the base of transistor 47 and turns on the transistor 47 to allow the diodes 45a . . . 45e to conduct to remove the input from the even AND gates and prevent digit value signals from being applied to the gates of any of the even SCR's. When the input signal on terminal 53 is at its low level, the base current is shunted by the diode 54, the transistor 47 is non-conductive and the diodes 45a . . . 45e are blocked so that a digit value signal on one of the terminals 20a . . . 20e will cause an output at the output terminal for the corresponding gate to cause the corresponding SCR to fire and indicate the digit. Thus, to indicate an even digit, the bi-level input signal at terminal 53 must be 0, if a binary notation is adopted, and an input, that is, a 1, must be applied to the proper digit terminal 20a . . . 20e before the even AND gates are effective to transmit a digit value signal.

In a similar manner, the output gate terminals 40a . . . 40e are connected to a respective one of the digit input terminals 20a . . . 20e by a respective diode, the output terminals 40a . . . 40e being connected to the digit input terminals 20a . . . 20e respectively by diodes 56a, 56b, 56c, 56d and 56e. The output terminals 40a . . . 40e are also connected by diodes 58a, 58b, 58c, 58d and 58e to a common conductor 60 and are connected by respective resistors 60a to the B+ terminal.

The conduction of the diodes 58a . . . 58e is controlled by a transistor 61 having its collector-emitter path connected between the conductor 60 and ground so that when the transistor is conductive, the diodes 58a . . . 58e are conductive and there is no input to the corresponding gates. When the transistor 61 is non-conductive, conduction through the diodes 58a . . . 58e is blocked and if a digit value signal appears on any of the input terminals 20a . . . 20e, it will be applied to the control element of the odd SCR connected thereto.

The transistor 61 has a base 61a connected to B+ terminal through series-connected diodes 63 and a resistor 64. A junction between the resistor 64 and the diodes 63 is connected through a diode 65 to an input terminal 66 to which a bi-level signal is applied. When the value of the signal is high, conduction of the diode 65 is blocked and base current flows from the B+ terminal through the diodes 63 and the base 61a to turn on the transistor 61 to connect the conductor 60 to ground causing the diodes 58a . . . 58e to conduct to hold the potential of the gate output terminals 40a . . . 40e at approximately ground to render the even SCR's non-responsive to digit value signals to the input terminals 20a . . . 20e. When, however, the level of the signal to the terminal 66 is low, the diode 65 conducts and shunts the base current from the transistor 61 causing the transistor to cut off, thus blocking the diodes 58a . . . 58e so that a digit value signal appearing on one of the input terminals 20a . . . 20e will cause the corresponding odd SCR to conduct.

From the foregoing, it will be seen that when the digit is an odd digit, a high level input must be applied to the terminal 53. The bi-level signal on the terminal 53 represents the presence or the absence of the binary digit 1 in the corresponding decoding section. If the digit is to be an even digit, the signal applied to the terminal 66 must be at a low level when the binary digit 1 is present in the corresponding decoding section and at a high level when the binary digit 1 is not present in the decoding section. Consequently, a 1 signal must be applied to the terminal 53 to signal the presence of the binary digit 1 on the decoder section and a $\bar{1}$ signal must be applied to the terminal 66 to signal the absence of the binary digit 1 in the corresponding decoder section to select the proper digit to be registered on the display tube 30.

The operation of the signal transmitting means described is controlled by erase-write circuit means to set and reset the display tube 30 in accordance with digit values applied to input terminals 20a . . . 20e. During operation, the transistors 47 and 61 are normally maintained conductive through an inhibit circuit 67. The inhibit circuit 67 is connected from the B+ terminal through a resistor 67a, a resistor 67b to a junction 67c which is in turn connected to each of the bases 61a, 47a by respective resistors 68a, 68b, and diodes 69a, 69b. Normally, current flow from the B+ terminal, through the resistors 67a, 67b, the transistors 68a, 68b and the diodes 69a, 69b maintains the transistors 61, 47 conductive so that a different digit cannot be registered in the display tube. It will be appreciated that when a digit has been registered by triggering an SCR, the characteristic of the SCR is such that conduction through the SCR will continue until it is stopped by removing the anode-cathode voltage of the SCR since SCR's are breakdown devices of the avalanche type whose breakdown is triggered by applying a signal to the gate electrode thereof.

During operation, the input terminals 20a . . . 20e of the display for the sections for one axis are periodically connected through the code converter and decoder to the corresponding encoder section to set the display in accordance with the number in the encoder section. However, before the display tube 30 can be set, it is necessary to erase the digit already set therein and this is accomplished by applying an erase-write signal to an input terminal 70 of the erase-write circuit means for each display tube 30. The erase-write circuit is shown in FIG. 3 for the display section 21a and the signal applied to the input terminal 70 renders a transistor 72 conductive to connect the anode 31 of the multi-display tube 30 to ground through a diode 73 and the collector-emitter path of the transistor 72. The transistor 72 when conductive also connects the anodes of all of the SCR's in the cathode circuits of the multi-cathode tube 30 to ground through respective resistors 76, a diode 74, and the collector-emitter path of the transistor 72. When the transistor 72 is conductive, any SCR which is conducting will be extinguished and is incapable of conducting current.

The conduction of transistor 72 also renders the inhibit circuit ineffective to maintain the transistors 47, 61 conductive. When the transistor 72 is rendered conductive by an erase-write signal on the terminal 70, the transistor 72 effectively shunts the inhibit circuit and the transistors 47, 61 are controlled by the signals which appear on the input terminals 53, 66. During the period that the transistor 72 is conductive, the transistors 46, 47 may be switching on and off as the digit changes between odd and even but the SCR's 33a . . . 33b and 36a . . . 36e will not be turned on in response to digit signals appearing on the terminals 20a . . . 20e since their anodes potential is removed. However, when the transistor 72 is rendered non-conductive at the end of the erase-write pulse, the anode voltages of the SCR's 33a . . . 33e, 36a . . . 36e will be immediately restored. However, the inhibit circuit 67 through the resistors 68a, 68b will not become immediately effective to render both of the transistors 47, 61 conductive and therefore the transistors 47, 61 will respond to the odd-even signals on the terminals 53, 66 and since the anode voltages have been restored to the SCR's, a digit signal on one of the terminals 20a . . . 20e will effect the firing of either an odd or an even SCR connected thereto depending upon which of the transistors 47, 61 is conductive. This delay in the return to effectiveness of the inhibit circuit is caused by a condenser 88 connected between the junction 67c and ground. Before either the transistors 47, 61 are rendered conductive in response to current supplied through the inhibit circuit 67, the voltage on the condenser 88 must build up sufficiently to effect a break down of the diodes 69a, 69b and to supply sufficient current to the transistors 47, 61 to render them conductive. It will be appreciated that it is during this momentary period between the end of the erase-write signal and the voltage build up on condenser 88 that the proper SCR is set in accordance with the digit on the input terminals 20a . . . 20e and the odd-even signal, and, in turn, a digit is displayed on the multi-cathode display tube 30.

The resistor 67b in the inhibit circuit is paralleled by a diode 90 to provide for quick discharge of the condenser 88 through the transistor 72 when the erase-write pulse is applied to the input terminal 70.

The 1 and $\bar{1}$ digit signals for the terminals 53 and 66 are derived from the decoding circuitry. As indicated in FIG. 1, the decoding circuitry for the fine zone has a binary 1 output terminal which has a high output when the binary 1 digit is present and a low output when it is absent. This output which is applied through respective gates to the display for the fine zones while the 10 or carry digit from each of the decoding circuits is connected through a respective gate to the display for the next higher encoder section to indicate the existence or absence of the digit 1 in the next coarser section.

The odd-even signal is derived from the 1 output terminal of the decoding circuitry for the sections 21,a 22a, while for the coarser sections of the display, it is derived from the 10 output terminal of the next finer section, as indicated in FIG. 1. The binary digit 1 output is shown in FIG. 3 as applied directly to the terminal 53 and through an inverter gate 99 to the terminal 66.

During operation, the decoding circuitry and the code converting circuitry for converting from binary decimal to the decimal are alternately connected between the X encoder and the X display and the Y encoder and the Y display. Referring to FIG. 1, X gating circuitry 100 is provided for connecting the X encoder to the inputs of the decoding circuitry and Y gating circuitry 102 is provided for connecting the Y encoder to the input of the code converting circuitry. Similarly, X gating circuitry 104 is provided for connecting the output of the code converting circuits, which converts codes from binary decimal-to-decimal, to the inputs of the display and for gating the odd-even signal from the decoder circuitry to the display. Similarly, Y gating circuitry 105 is provided for connecting the decoder output to the Y display together with the odd-even signal from the decoder circuitry.

When the X gating circuits 100, 104 are conditioned the encoder 10 is connected to the decoding circuitry and the X display is connected to the output of the binary decimal-to-decimal code converting circuitry. When the Y gating circuits 102, 105 are actuated, the Y encoder is connected to the input of the decoding circuitry and the Y display is connected to the output of the code converting circuitry.

The X gates and the Y gates are alternately conditioned by clock signals which may be derived from a binary circuit 110 having an X output 111 and a Y output 112. An oscillator 114 supplies pulses to the input of the binary counter 110 to alternately change the outputs on the X output 111 and the Y output 112 from a 1 value to a 0 value with the resulting square waves in the outputs being 180° out of phase so that when the X gates are conditioned, the Y gates are not conditioned and vice versa.

Also connected to the X outputs and the Y outputs is an X erase-write signal generator 115 and a Y erase-write signal generator 116. These circuits are differentiating circuits which differentiate the leading edge of the pulse of the square wave and apply a pulse signal to the erase-write terminal 70 of each of the display sections. If desired, the differentiated pulse can be applied to the terminal through a pulse stretcher.

It will be appreciated that as a machine tool member moves along the X and Y axes as a result of motion of drive elements such as an X lead screw and a Y lead screw, the motion of the corresponding lead screws are encoded by the X and Y encoders respectively to continuously indicate the position of the member along the coordinate axes. When the X gates are actuated, this position is decoded by the decoding circuitry converted by the code converter and applied to the input terminals of the display. At the beginning of the time period during which the X gates are conditioned, the erase-write pulse will be applied to the terminals 70 for each display tube of the X display since the circuit differentiates the leading edge of the conditioning signal applied to the gates. This pulse will erase, as described above, any setting in the multicathode display tubes 30 of the X display and render the even-odd blanking circuitry responsive to the even-odd signal derived from the decoder. However, no reading will be set in the X display until the erase-write pulse terminates and then, during the momentary period required to charge the capacitors 88 in the erase-write circuitry, a setting will be registered on the display tube by the actuation of one of the SCR's connected to the digit input terminals upon which digit value signals are applied as determined by the even-odd signals. This period is only a momentary period and as soon as the condensers 88 are charged, the inhibit circuitry in each display section become effective to prevent other SCR's from being responsive to a change in digit signals on the input terminals even though the gating period extends for a period thereafter. If the part is moving, there may be more than one digit registered, but this is not disadvantageous since the higher or lower member may be read depending on direction of movement. Moreover, the readout is most commonly read at the final position when the member is stopped. In this situation there will be only one digit registered. Under these conditions the inhibit circuitry will prevent time lags from causing digits to be registered in the wrong axis readout.

Figure 5:
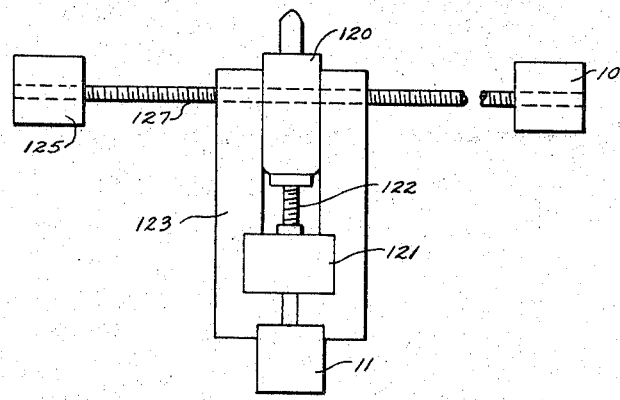
FIG. 5 is a simplified showing of a member movable along two coordinate axes.

The present invention has been disclosed in a two coordinate system and may be utilized to indicate the position of a member movable along two coordinate axes as shown in FIG. 5, which is a simplified drawing. In FIG. 5, a member 120 is moved along the Y coordinate axes by a motor 121 which is connected by a lead screw 122 to drive the member 120. The member 120 is supported on a carriage 123 which is movable along the X axis by the operation of the motor 125 which is connected to drive the carriage along the X axis by a lead screw 127. The X and Y encoder means 10 and 11, respectively, are driven from the lead screws 122, 127.

While the present invention has been illustrated in a two-axes system, it will be understood by those skilled in the art that it is adaptable for more than two coordinate axes. In such a system, for example, a three axes system, a three-bit counter would be used to multiplex the converting and decoding circuitries to connect it in turn between the X axis encoder and the X axis readout, the Y axis encoder and the Y axis readout, and the Z axis encoder and the Z axis readout. Such three-bit counters are well known in the art. The Z axis will have encoders, dates, and readouts corresponding to those described for X and Y axes. Corresponding multiplexing circuits are known for four or more axes.

It can now be seen that the present invention provides a new and improved digit indicating system and that further constructions, modifications, and arrangements will be within the ability of those skilled in the art and it is hereby my intention to cover all such constructions, modifications, and arrangements which fall within the scope and spirit of the appended claims.

What is claimed is:

1. A readout system comprising indicating means activated by a code signal, a multi-element display means each element of which may be selectively energized to display a value, a plurality of bistable energizing triggerable means each of which are coupled to one of said elements of said display means, a plurality of gate means each coupled to receive said coded signal and to said plurality of triggerable means for selectively supplying triggering signals to said triggerable means in accordance with the coded signal which is received by said gate means, each of said triggerable means being constructed to be in a display-producing state upon the receipt of an associated triggering signal from said gate means and to remain in said display-producing state until reset by a reset signal to an inactive state, resetting means for providing a reset signal to each of said triggering means in order to erase the displayed value in said display means, and inhibit means coupled to the gate means for preventing said gate means from coupling said triggering signals to said triggerable means except during a limited period of time following the resetting of said triggerable means.

2. A readout system as set forth in claim 1 wherein each of said triggerable means comprises controlled-rectifiers each of which has its anode-cathode path connected in series with an element of said display means and a gate coupled to said gate means.

3. A readout system as set forth in claim 2 wherein the controlled-rectifiers are divided into a first group and a second group and said gate means comprises group-selection means which is coupled to said inhibiting means, said group-selection means being inhibited by said inhibit means except during said limited period of time.

4. In a system for indicating the position of a member along coordinate axes as position numbers representing the distance along the axes from reference planes, an encoding means for each axis providing signals digitally representing the position of said member along the axis from a reference plane in a binary system, circuit means for decoding and converting said signals from one encoding means to signals indicating decimal values for the respective digits of a position number, readout means for each axis comprising a multi-cathode display tube for each digit of the position number, gate means corresponding to each axis for connecting the corresponding encoder and readout means to the input and output respectively of said circuit means, clock means for actuating the gate means for said axes to connect said circuit means to the encoding means and readout means for the respective axes in sequence, said readout means for each axis comprising a bistable current conducting device in circuit with each of said cathodes which is switched from a non-conductive state to a conductive state to indicate a digit value, and signal transmitting means for transmitting digit signals to switch the current conducting device corresponding to a digit value to be indicated to its conductive state and erase-write means for resetting conductive ones of said devices to their non-conductive state and rendering said signal transmitting means effective after resetting to transmit digit signals, and first circuit means for actuating each erase-write means during the period the corresponding readout means is connected to the output of said circuit means.

5. In the system defined in claim 4 wherein said current conducting devices comprise a breakdown device of the avalanche type having a control electrode and an anode-cathode path across which a voltage appears.

6. In the system defined in claim 5 wherein each of said erase-write means comprises circuit means responsive to an erase signal from said circuit means for reducing the anode-cathode voltage of said breakdown devices to a level where the devices are incapable of conducting to thereby reset the devices to their non-conductive state.

7. In a system as defined in claim 4 wherein said signal transmitting means includes AND gates and said erase-write means comprises control circuit means normally rendering said AND gates ineffective to transmit signals and operable in response to operation of said first circuit means to condition said AND gates to be effective to transmit digit indicating signals to the corresponding breakdown devices.

8. In a system as defined in claim 7 wherein said first circuit means provides an erase signal and said signal transmitting means comprises transistor means rendered nonconductive to condition said AND gates of said signal transmitting means to transmit digit signals and said erase-write circuit means comprises a circuit normally clamping the input of said transistor means to render said transistor means conductive and rendered ineffective to clamp the input of said transistor means in response to said erase signal.

9. In a system as defined in claim 8 wherein said control circuit means includes a condenser connected across the input of said transistor means and comprises means for discharging said condenser and unclamping the input to said transistor means in response to the presence of an erase signal.

10. In a system as defined in claim 9 wherein said current conducting devices are breakdown devices having control electrodes for controlling the triggering thereof and said erase-write means comprises circuit means responsive to said erase signal for reducing the anode-cathode voltage of said breakdown devices to a level where the devices are incapable of conducting to thereby reset the devices to their nonconductive state.

References Cited
UNITED STATES PATENTS

| | | | |
|---|---|---|---|
| 3,014,659 | 12/1961 | Dickinson | 235—152 |
| 3,304,548 | 2/1967 | Klinikowski | 340—347 |
| 3,349,228 | 10/1967 | Gordon et al. | 235—92 |
| 3,372,265 | 3/1968 | Gordon et al. | 235—92 |
| 3,395,268 | 7/1968 | Barton | 235—92 |

MAYNARD R. WILBUR, Primary Examiner

G. R. EDWARDS, Assistant Examiner